(12) United States Patent
Kuwabara et al.

(10) Patent No.: US 7,907,135 B2
(45) Date of Patent: Mar. 15, 2011

(54) IMAGE DISPLAY AND IMAGE DISPLAYING METHOD FOR GRADATION CORRECTION

(75) Inventors: Akihiro Kuwabara, Nara (JP); Takayuki Kimoto, Osaka (JP); Yoshio Seki, Osaka (JP)

(73) Assignee: Panasonic Corporation, Osaka (JP)

( * ) Notice: Subject to any disclaimer, the term of this patent is extended or adjusted under 35 U.S.C. 154(b) by 889 days.

(21) Appl. No.: 11/721,965

(22) PCT Filed: Feb. 28, 2006

(86) PCT No.: PCT/JP2006/303802
§ 371 (c)(1),
(2), (4) Date: Jun. 15, 2007

(87) PCT Pub. No.: WO2006/103862
PCT Pub. Date: Oct. 5, 2006

(65) Prior Publication Data
US 2009/0251448 A1    Oct. 8, 2009

(30) Foreign Application Priority Data
Mar. 29, 2005   (JP) ................................. 2005-095740

(51) Int. Cl.
*G06F 3/038* (2006.01)
(52) U.S. Cl. ......................................... 345/207; 345/63
(58) Field of Classification Search .................. None
See application file for complete search history.

(56) References Cited

U.S. PATENT DOCUMENTS

| | | | | |
|---|---|---|---|---|
| 5,406,305 A * | 4/1995 | Shimomura et al. | .......... | 345/102 |
| 5,642,172 A * | 6/1997 | Yoon et al. | .................... | 348/603 |
| 5,786,801 A * | 7/1998 | Ichise | ........................... | 345/102 |
| 6,207,943 B1 * | 3/2001 | Smelker | ........................ | 250/205 |
| 6,259,426 B1 * | 7/2001 | Harada et al. | ................. | 345/581 |
| 6,711,286 B1 * | 3/2004 | Chen et al. | .................... | 382/162 |
| 6,791,716 B1 * | 9/2004 | Buhr et al. | ..................... | 358/1.9 |
| 7,199,840 B2 | 4/2007 | Shiota | | |
| 2002/0122048 A1 * | 9/2002 | Kanai | ........................... | 345/690 |

(Continued)

FOREIGN PATENT DOCUMENTS

DE           19721984           12/1998

(Continued)

OTHER PUBLICATIONS

European Search Report dated Jun. 8, 2010, 7 pages, for Application No. 06714926.0-2202.

*Primary Examiner* — Alexander Eisen
*Assistant Examiner* — Matthew Yeung

(57) ABSTRACT

A projector 1 detects a luminance distribution in an effective video period of an inputted video luminance signal, and a coefficient calculating circuit 302 calculates a correction coefficient $C_i$ to correct a gradation (FIG. 6A). Then, surrounding brightness is detected, and the correction coefficient $C_i$ is adjusted based on the surrounding brightness to obtain an adjusted correction coefficient $C_i'$ (FIG. 6B). As shown in FIG. 6C, a luminance can be raised to Q according to a brightness signal even for a pixel of a lowest input luminance by adjusting the correction coefficient. Other correction coefficients in a range of 0 to 255 before adjustment are proportionally distributed to a range of 0 to 255-Q, and added with a correction coefficient Q. A luminance of each pixel which belongs to the effective video period of the video luminance signal is adjusted using the adjusted correction coefficient.

14 Claims, 19 Drawing Sheets

U.S. PATENT DOCUMENTS

| | | | |
|---|---|---|---|
| 2003/0020725 A1* | 1/2003 | Matsuda | 345/600 |
| 2005/0057486 A1* | 3/2005 | Aoki et al. | 345/102 |
| 2005/0212726 A1* | 9/2005 | Namba et al. | 345/63 |
| 2006/0013478 A1 | 1/2006 | Ito et al. | |

FOREIGN PATENT DOCUMENTS

| | | |
|---|---|---|
| EP | 1 178 672 | 2/2002 |
| EP | 1 189 434 | 3/2002 |
| JP | 58-75384 | 5/1983 |
| JP | 3-074969 | 3/1991 |
| JP | 6-230760 | 8/1994 |
| JP | 9-190170 | 7/1997 |
| JP | 10-248024 | 9/1998 |
| JP | 2001-309280 | 11/2001 |
| JP | 2002-359754 | 12/2002 |
| JP | 2003-228330 | 8/2003 |
| WO | 2004/032524 | 4/2004 |

* cited by examiner

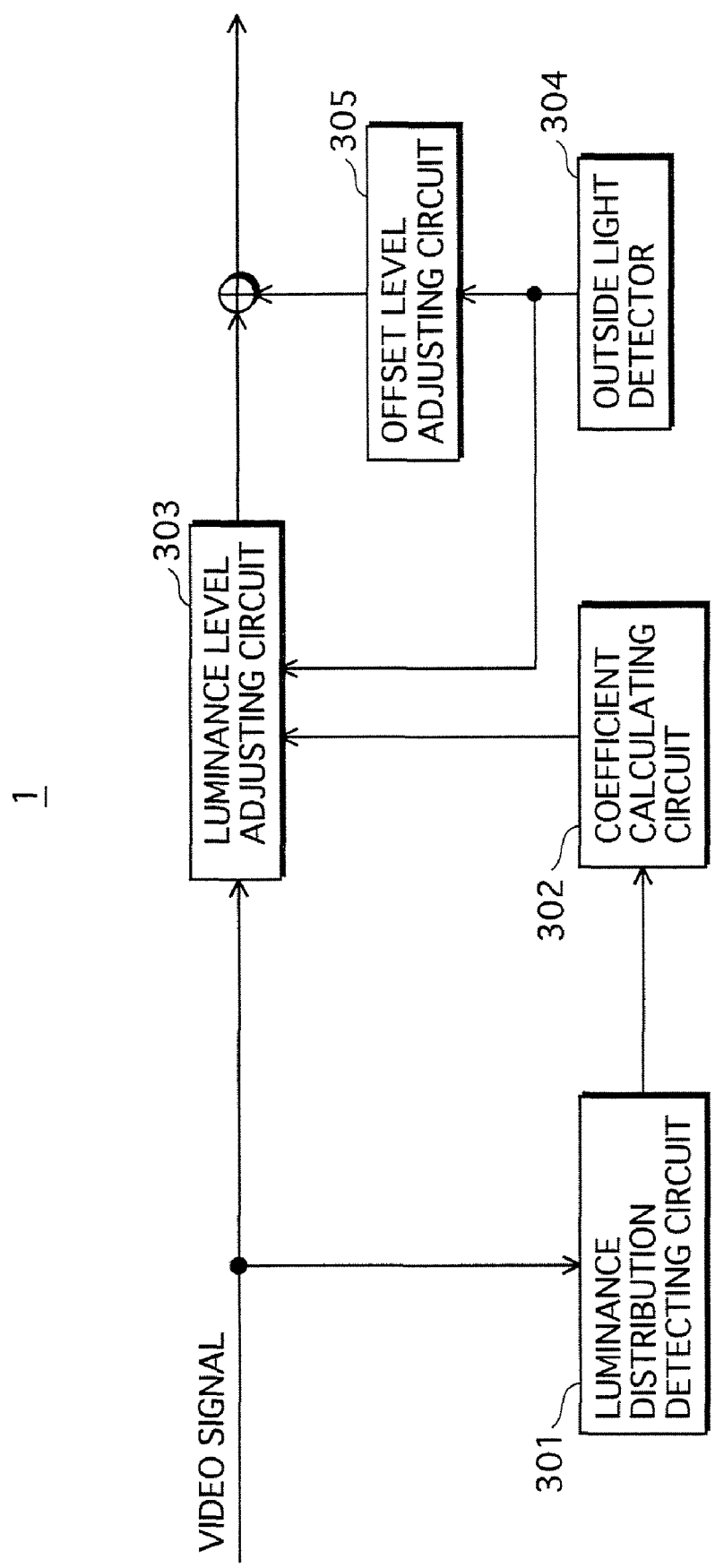

LUMINANCE FREQUENCY DISTRIBUTION

LUMINANCE FREQUENCY DISTRIBUTION IN FOUR LEVELS

US 7,907,135 B2

IMAGE DISPLAY AND IMAGE DISPLAYING METHOD FOR GRADATION CORRECTION

TECHNICAL FIELD

The present invention relates to an image display device and an image display method, and especially relates to a technology for correcting a gradation so as to improve visibility by eliminating an effect of outside light.

BACKGROUND ART

A digital signal processing technology is conventionally applied to a wide range of fields such as an image display device like a projector. For example, a histogram conversion method is a technology for correcting an image gradation, and is also useful for improving a contrast of an image projected by a projector. In view of a projector field characteristic, further improvements of the histogram conversion method have been made.

A patent document 1 discloses an example of such technology improvements. Originally, a histogram conversion has been performed with regard to all luminance ranges. However, in the patent document 1, a histogram conversion is performed with regard to a range from a minimum value to a maximum value in an effective video period of a video luminance signal, using a gradation correction coefficient according to a difference between the maximum value and the minimum value.

FIG. 1 is a functional block diagram showing a construction of an image processor of the conventional technology. As shown in FIG. 1, an image processor 20 includes a minimum value detecting circuit 2001, a maximum value detecting circuit 2002, a differential device 2003, a correction coefficient calculating circuit 2004, and a correcting circuit 2005. When receiving an input video luminance signal, the image processor 20 detects a minimum value in an effective video period of the input video luminance signal in the minimum value detecting circuit 2001, and a maximum value in the maximum value detecting circuit 2002. Then, a difference between the maximum value and the minimum value is obtained in the differential device 2003, and a correction coefficient is determined according to the difference in the correction coefficient calculating circuit 2004. The input video luminance signal is corrected according to the correction coefficient in the correcting circuit 2005, and the corrected input video luminance signal is outputted as an output video luminance signal. This further improves an image contrast.

Patent Document 1: Japanese Published Patent Application No. 3549356

DISCLOSURE OF THE INVENTION

Problems the Invention is Going to Solve

However, when considering a usage environment of a projector, it is not necessarily the case that light is completely shielded as in a movie theater. Therefore, viewability of projected video is not always optimum by merely performing a gradation correction only in view of a video luminance signal characteristic as in the above-mentioned conventional technology. For example, it is well known that room lighting, sunlight, and the like have an effect on a visual environment, causing poor viewability.

To solve the above-mentioned problem, the present invention aims to provide an image display device and an image display method which display an easily viewable image regardless of a visual environment change.

Means of Solving the Problems

The above problem is solved by an image display device for displaying a multiple gradation image, comprising: a light measuring unit (such as an outside light detector 304 in FIG. 4) operable to measure an outside light intensity; and a correcting unit (such as a luminance level adjusting circuit 303 in FIG. 4) operable to perform a gradation correction to cause (i) luminance values to be distributed in a smaller luminance value range, the larger the outside light intensity is, and (ii) the luminance value range to include a highest luminance value displayable by the image display device (such as an offset level adjusting circuit 305 in FIG. 4).

EFFECTS OF THE INVENTION

With the above-stated construction, a luminance can be increased according to an outside light intensity. Therefore, an easily viewable image can be displayed regardless of a visual environment change.

In the image display device of the present invention, the gradation correction is performed to cause a correction coefficient $C_i$ to be larger, the larger a frequency of the luminance values in a portion of the luminance value range is (such as a coefficient calculating circuit 302 in FIG. 4). With the above-stated construction, visibility can be improved by reducing contrast deterioration caused by an increase of a luminance lower limit. Note that a portion in which more luminances are distributed means luminances having high frequencies.

The image display device of the present invention further comprises a detecting unit (such as a skin color detecting circuit 806 in FIG. 9) operable to detect a skin color pixel having a skin color luminance and a skin color hue, wherein the performance of the gradation correction on the skin color pixel is suppressed. With the above-stated construction, a luminance of a skin color portion is not corrected. Therefore, a natural image can be displayed by avoiding a color tone change.

In this case, it is preferable that the gradation correction is performed on a pixel other than the skin color pixel to cause a luminance change to be smaller, the closer to a skin color a luminance value and a hue of the pixel are. Also, the performance of the gradation correction on the skin color pixel is suppressed when other skin color pixels exist around the skin color pixel.

The image display device of the present invention further comprises a first calculating unit (such as an average luminance calculating circuit 1106 in FIG. 11) operable to calculate an average luminance value $M_0$ of all pixels composing the image; and a changing unit (such as a luminance level adjusting circuit 1103 in FIG. 11) operable to, if a difference between an average luminance value $M_1$ and the average luminance value $M_0$ is larger than a predetermined value, change a correction coefficient $C_i'$ to cause the difference to be equal to or smaller than the predetermined value, the average luminance value $M_1$ being obtained by the correcting unit performing the gradation correction on the average luminance value $M_0$. With the above-stated construction, a big change of an average luminance can be avoided. Therefore, a natural image can be displayed by reducing an excessive change of a gradation.

The image display device of the present invention further comprises a lowering unit (such as a black level correcting circuit 1706 in FIG. 17) operable to lower luminance values in a predetermined luminance value range including a lowest luminance value, if the luminance values are higher than a predetermined luminance value after the gradation correction is performed by the correcting unit. With the above-stated construction, a sharp image can be displayed by preventing a low luminance portion from being brighter than other portions.

The image display device of the present invention further comprises a second calculating unit (such as a maximum value detecting circuit 1406 and a minimum value detecting circuit 1407 in FIG. 14) operable to calculate a maximum value and a minimum value of luminance values of all pixels composing the image; and a distributing unit (such as a luminance distribution detecting circuit 1401) operable to, as a luminance distribution, proportionally distribute frequencies of the luminance values distributed in a range of the minimum value to the maximum value, to a range of 0 to a maximum gradation number, wherein the gradation correction is performed on the proportionally distributed luminance distribution. With the above-stated construction, visibility can be improved by enhancing an image contrast.

The above problem is solved by an image display method performed by an image display device for displaying a multiple gradation image, the image display method comprising: a light measuring step (such as S604 in FIG. 7) of measuring an outside light intensity; and a correcting step (such as S606 in FIG. 7) of performing a gradation correction to cause (i) luminance values to be distributed in a smaller luminance value range, the larger the outside light intensity is, and (ii) the luminance value range to include a highest luminance value displayable by the image display device (such as S607 in FIG. 7). With the above-stated construction, an easily viewable image can be displayed regardless of a visual environment change because a luminance is improved according to an outside light intensity.

In the image display method of the present invention, the gradation correction is performed to cause a correction coefficient $C_i$ to be larger, the larger a frequency of the luminance values in a portion of the luminance value range is (such as S603 in FIG. 7). With the above-stated construction, visibility can be improved by reducing contrast deterioration caused by an increase of a luminance lower limit.

The image display method of the present invention further comprises a detecting step (such as S902 in FIG. 10) of detecting a luminance or a hue of a skin color pixel, wherein the performance of the gradation correction on the skin color pixel is suppressed. With the above-stated construction, a luminance of a skin color portion is not corrected. Therefore, a natural image can be displayed by avoiding a color tone change.

In this case, it is preferable that the gradation correction is performed on a pixel other than the skin color pixel to cause a luminance change to be smaller, the closer to a skin color a luminance value and a hue of the pixel are. Also, the performance of the graduation correction on the skin color pixel is suppressed when other skin color pixels exist around the skin color pixel.

The image display method of the present invention further comprises a first calculating step (such as S1202 in FIG. 12) of calculating an average luminance value $M_0$ of all pixels composing the image; and a changing step (such as S1206 in FIG. 12) of, if a difference between an average luminance value $M_1$ and the average luminance value $M_0$ is larger than a predetermined value, changing a correction coefficient $C_i'$ to cause the difference to be equal to or smaller than the predetermined value, the average luminance value $M_1$ being obtained by the correcting unit performing the gradation correction on the average luminance value $M_0$. With the above-stated construction, a big change of an average luminance can be avoided. Therefore, a natural image can be displayed by reducing an excessive change of a gradation.

The image display method of the present invention further comprises a lowering step (such as S1807 in FIG. 18) of lowering luminance values in a predetermined luminance value range including a lowest luminance value, if the luminance values are higher than a predetermined luminance value after the gradation correction is performed by the correcting step. With the above-stated construction, a sharp image can be displayed by preventing a low luminance portion from being brighter than other portions.

The image display method of the present invention further comprises a second calculating step (such as S1502 and S1503 in FIG. 15) of calculating a maximum value and a minimum value of luminance values of all pixels composing the image; and a distributing step (such as S1504 in FIG. 15) of, as a luminance distribution, proportionally distributing frequencies of the luminance values distributed in a range of the minimum value to the maximum value, to a range of 0 to a maximum gradation number, wherein the gradation correction is performed on the proportionally distributed luminance distribution. With the above-stated construction, visibility can be improved by enhancing an image contrast.

BRIEF DESCRIPTION OF THE DRAWINGS

FIG. 4 is a block diagram showing a main functional construction of the projector 1 of the first embodiment of the present invention.

Figure 1:
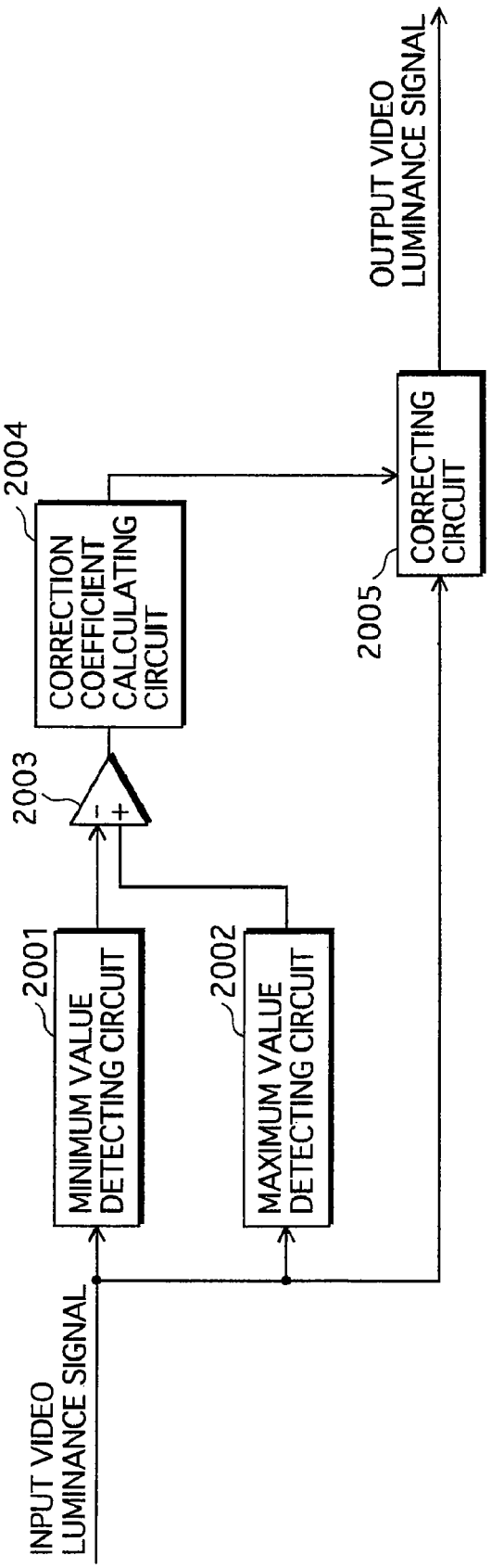
FIG. 1 is a functional block diagram showing a construction of an image processor of a conventional technology.

DESCRIPTION OF REFERENCE NUMERALS 1, 8, 11, 14, 17: projector
20: image processor
101: personal computer
102: screen
201: video input terminal
202: S-video input terminal
203: RGB/YPbPr input terminal
204: remote control light receiving unit
205: lens
206: direction key
207: determination button
208: outside light sensor
301, 801, 1101, 1401, 1701: luminance distribution detecting circuit
302, 802, 1102, 1402, 1702: coefficient calculating circuit
303, 803, 1103, 1403, 1703: luminance level adjusting circuit
304, 804, 1104, 1404, 1704: outside light detector
305, 805, 1105, 1405, 1705: offset level adjusting circuit
806: skin color detecting circuit
1106: average luminance calculating circuit
1406, 2002: maximum value detecting circuit
1407, 2001: minimum value detecting circuit
1706: black level correcting circuit
2003: differential device
2004: correction coefficient calculating circuit
2005: correcting circuit

BEST MODE FOR CARRYING OUT THE INVENTION

The following describes an image display device and an image display method according to embodiments of the present invention by taking a projector as an example, with reference to the attached drawings.

[1] First Embodiment

Firstly, a projector of a first embodiment of the present invention will be described.

(1) Construction of Projector

Figure 2:
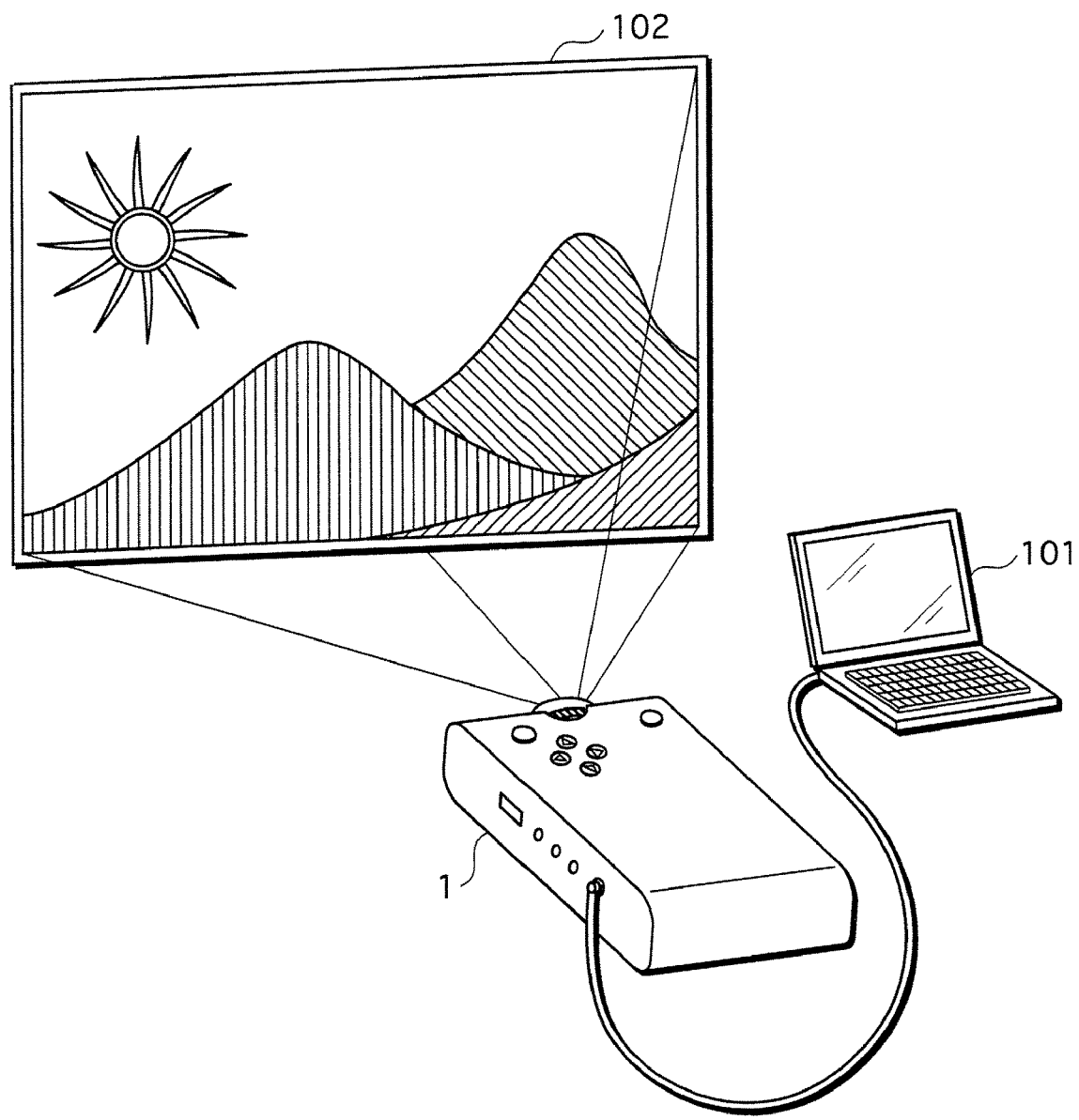
FIG. 2 shows a usage pattern of a projector of a first embodiment of the present invention.

FIG. 2 shows a usage pattern of the projector of the first embodiment. As shown in FIG. 2, a projector 1 receives a video luminance signal from a personal computer 101, and processes the video luminance signal. Then, the projector 1 outputs the processed video luminance signal to a built-in liquid crystal panel to project the processed video luminance signal onto a screen 102.

Figure 3:
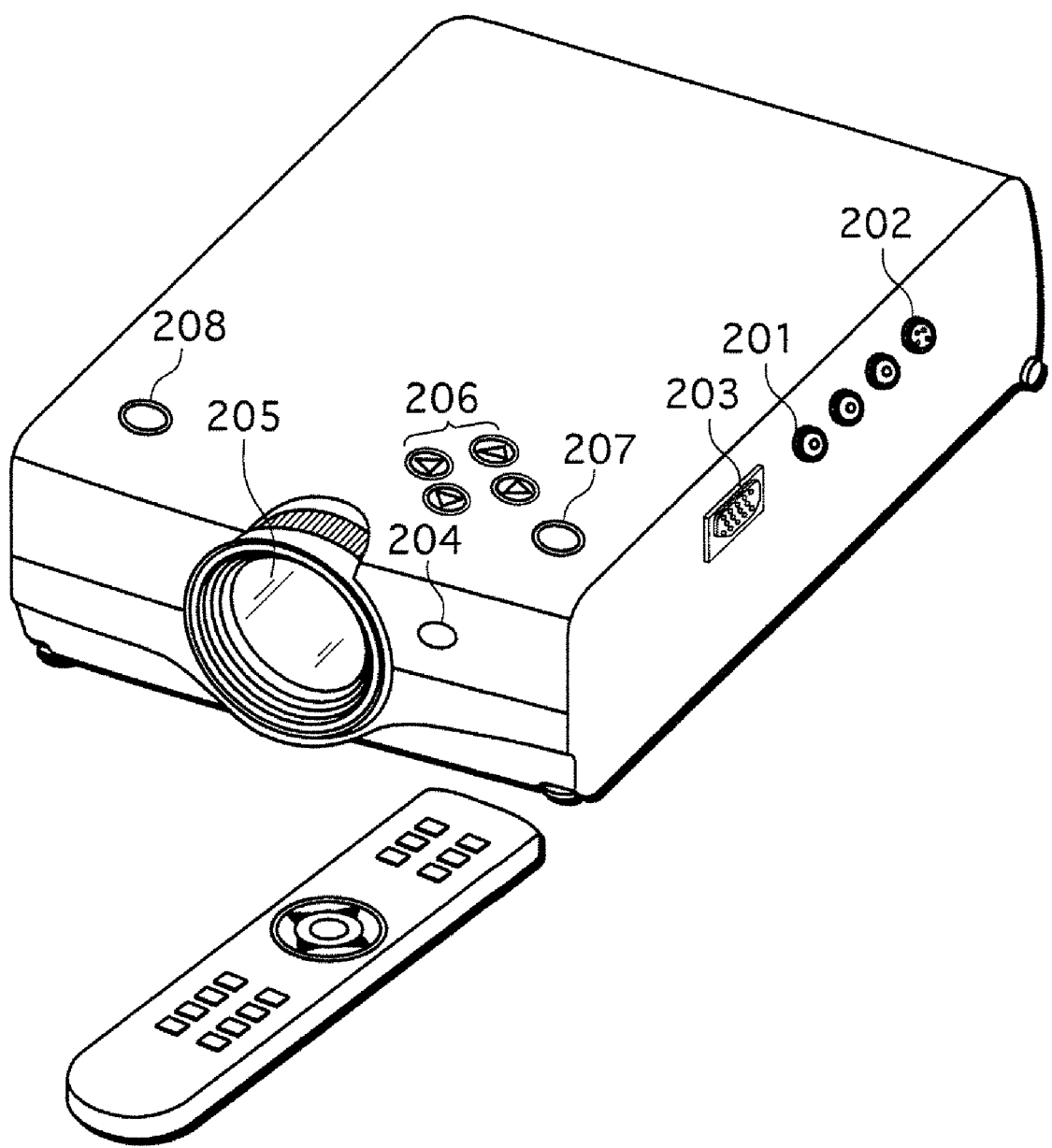
FIG. 3 is an appearance diagram of a projector 1 of the first embodiment of the present invention.

FIG. 3 is an appearance diagram of the projector 1. As shown in FIG. 3, the projector 1 includes a video input terminal 201, an S-video input terminal 202, an RGB/YPbPr input terminal 203, a remote control light receiving unit 204, a lens 205, direction keys 206, a determination button 207, and an outside light sensor 208. The video input terminal 201, the S-video input terminal 202, and the RGB/YPbPr input terminal 203 are arranged on a side of an enclosure. The remote control light receiving unit 204 and the lens 205 are arranged on a front of the enclosure. The direction keys 206, the determination button 207, and the outside light sensor 208 are arranged on an upper surface of the enclosure. The outside light sensor 208 detects brightness around the projector 1.

FIG. 4 is a block diagram showing a main functional construction of the projector 1. As shown in FIG. 4, the projector 1 includes a luminance distribution detecting circuit 301, a coefficient calculating circuit 302, a luminance level adjusting circuit 303, an outside light detector 304, and an offset level adjusting circuit 305.

Figure 5A:
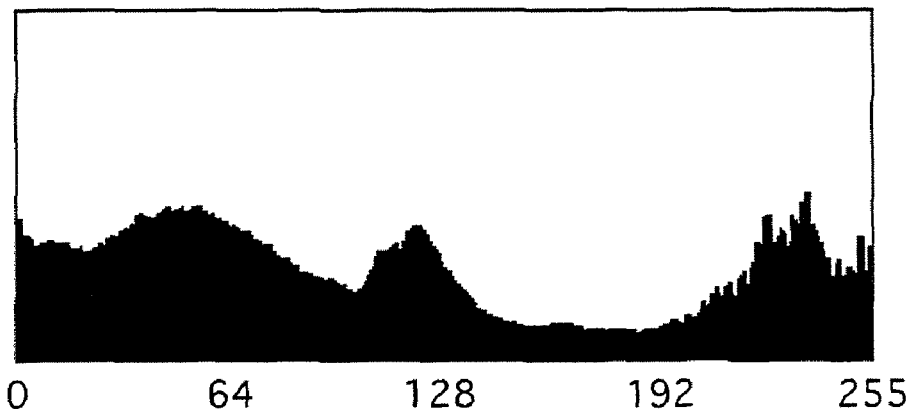
FIG. 5 is a graph showing a luminance distribution in an effective video period of a video luminance signal.
Figure 5B:
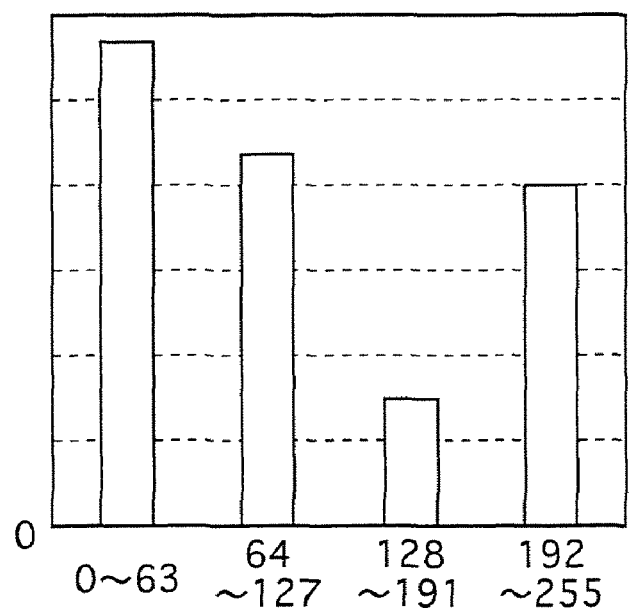

The luminance distribution detecting circuit 301 detects a luminance distribution in an effective video period of an inputted video luminance signal. FIG. 5 is a graph showing a luminance distribution in an effective video period of a video luminance signal. FIG. 5A shows the luminance distribution in the effective video period of the video luminance signal, and FIG. 5B shows a luminance distribution detected by the luminance distribution detecting circuit 301 when the video luminance signal having the luminance distribution is inputted.

In detail, as shown in FIG. 5A, the video luminance signal having the luminance distribution of 8 bits: 256 gradations is inputted to the luminance distribution detecting circuit 301. The luminance distribution detecting circuit 301 detects four luminance distributions which are made by dividing the 256 gradations into four levels, i.e. from 0 to 63, from 64 to 127, from 128 to 191, and from 192 to 255 (FIG. 5B).

Figure 6A:
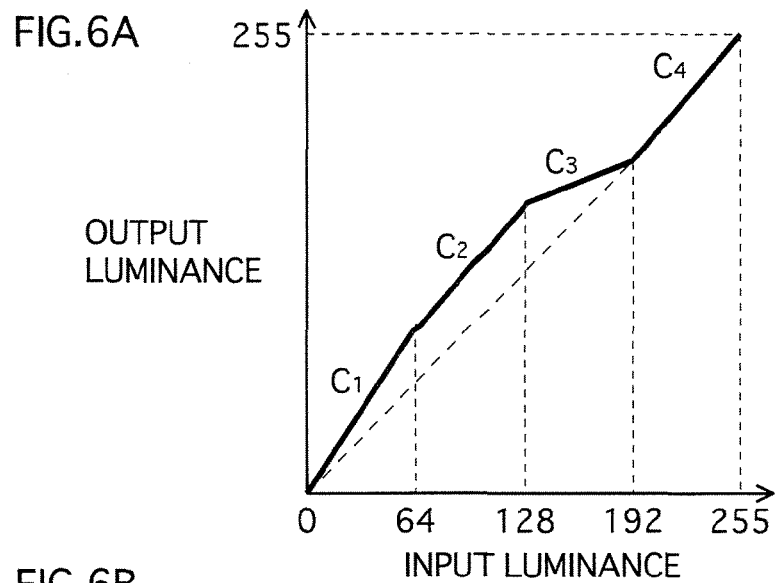
FIG. 6 is a graph showing that the projector 1 of the first embodiment of the present invention adjusts a correction coefficient.

When receiving the four-level luminance distributions from the luminance distribution detecting circuit 301, the coefficient calculating circuit 302 calculates a correction coefficient $C_i$ (i=1 to 4) for each of the four-level luminance distributions in order to correct the gradations, using the following formula (FIG. 6A).

< Formula 1 >

$$C_i = \frac{Fi}{(P/4)} \quad (1)$$

Here, P is the number of all pixels in an image, and $F_i$ (i=1 to 4) indicates a frequency for each of the four-level luminance distributions:

< Formula 2 >

$$P = \sum_{i=1}^{4} Fi. \quad (2)$$

As mentioned above, the correction coefficient $C_i$ is calculated using a luminance distribution. Note that the correction coefficient $C_i$ indicates a slope of each part of a graph shown in FIG. 6A.

The outside light detector 304 detects brightness around the projector 1 using the outside light sensor 208, and inputs a brightness signal indicating the detected brightness to the luminance level adjusting circuit 303.

The luminance level adjusting circuit 303 adjusts the correction coefficient $C_i$ received from the coefficient calculating circuit 302, based on the brightness signal received from the outside light detector 304. In other words, the luminance level adjusting circuit 303 adjusts the correction coefficient $C_i$ using a correction coefficient Q indicated by the brightness signal, according to the following formula.

< Formula 3 >

$$C'_i = \frac{256-Q}{256} \cdot C_i \quad (3)$$

Figure 6B:
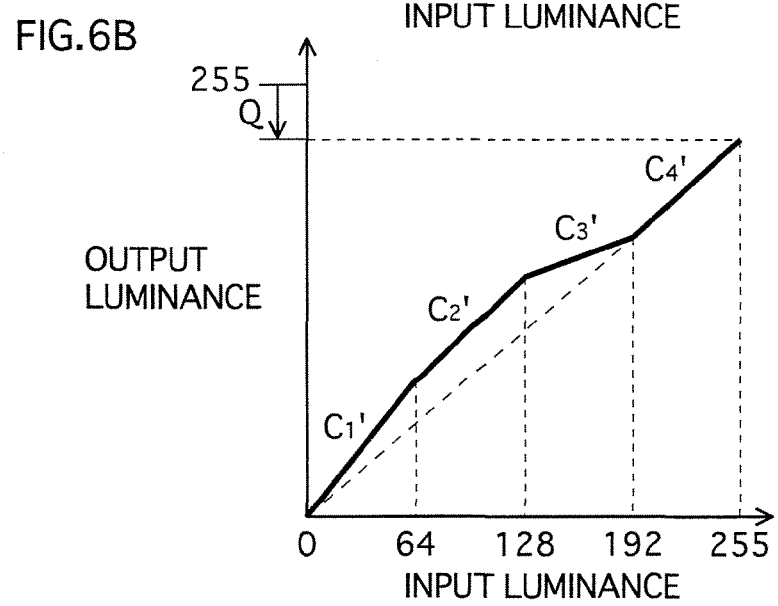
Figure 6C:
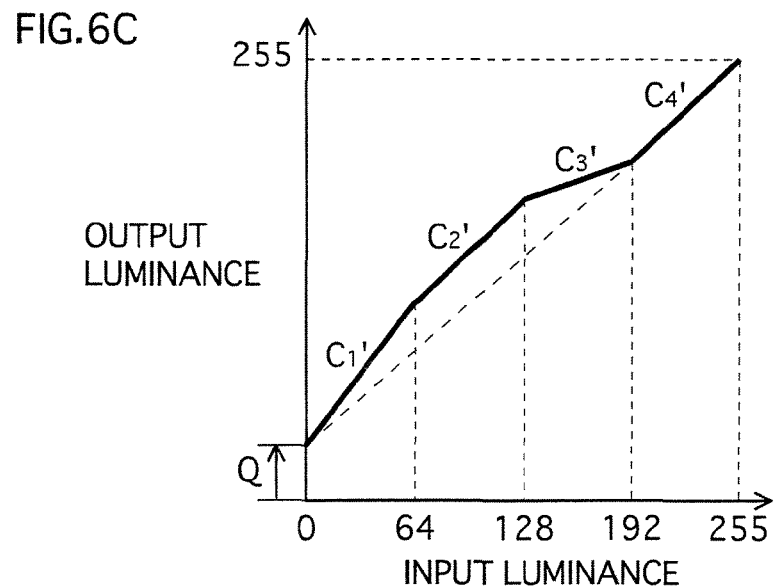

FIG. 6B is a graph showing a correction coefficient $C_i'$ (i=1 to 4) in the process of being adjusted. The correction coefficient is in a range of 0 to 255 before being adjusted. However, as shown in FIG. 6B, the correction coefficient is proportionally distributed in a range of 0 to 255-Q because the luminance level adjusting circuit 303 adjusts the correction coefficient.

Next, luminances of all pixels are increased by the correction coefficient Q. In other words, a luminance after the correction is obtained by the following formula.

< Formula 4 >

$$D_O = C'_n \left[ D_I - \frac{256}{4}(n-1) \right] + \sum_{i=1}^{n-1} \frac{256}{4} C'_i + Q \quad (4)$$

Here, $D_I$ is the luminance before the correction, and belongs to an n-th level (n=1 to 4) of the four-level luminance distributions. Also, $D_O$ is the luminance after the correction. This enables a pixel having a lowest input luminance to be increased to a luminance Q, according to a brightness signal. Thus, the offset level adjusting circuit 305 adjusts a luminance of each pixel which belongs to an effective video period of a video luminance signal, using the correction coefficient $C_i'$ obtained by the luminance level adjusting circuit 303.

(2) Operation of Projector

Figure 7:
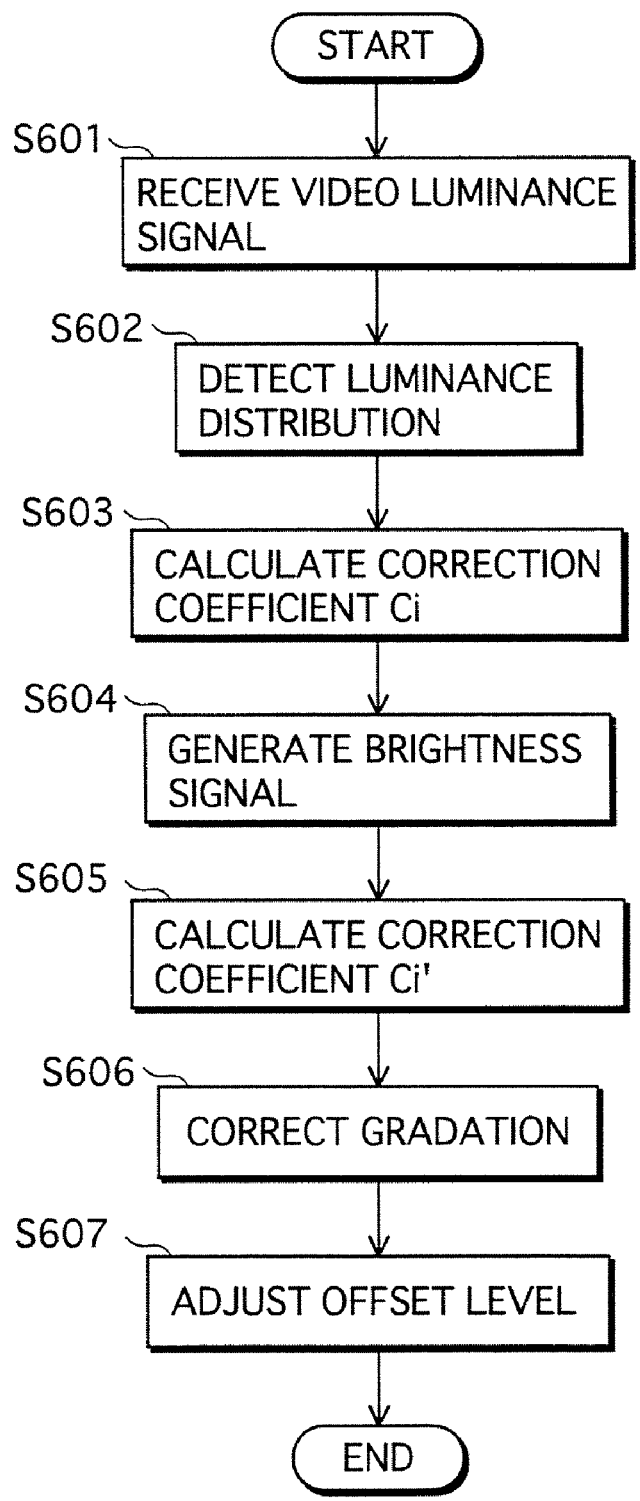
FIG. 7 is a flowchart showing a gradation correction process performed by the projector 1 of the first embodiment of the present invention.

Then, an operation of the projector 1, especially a process for correcting a gradation will be described. FIG. 7 is a flowchart showing the gradation correction process performed by the projector 1. As shown in FIG. 7, when receiving a video luminance signal (S601), the projector 1 detects a luminance distribution in an effective video period of the video luminance signal, in the luminance distribution detecting circuit 301 (S602), and calculates a correction coefficient $C_i$ for each of the four-level luminance distributions in the coefficient calculating circuit 302 (S603).

Next, the projector 1 generates a brightness signal indicating surrounding brightness in the outside light detector 304 (S604), and obtains a correction coefficient $C_i'$ from the correction coefficient $C_i$, using the brightness signal in the luminance level adjusting circuit 303 (S605) to correct an image gradation (S606). Finally, the projector 1 adjusts an offset level in the offset level adjusting circuit 305 (S607).

(3) Comparison with Conventional Gradation Correction Method

Then, a gradation correction method of a conventional technology is compared with a gradation correction method of the first embodiment. FIG. 8 is a graph showing a correction coefficient of the gradation correction method of the conventional technology, and a correction coefficient of the gradation correction method of the first embodiment.

Figure 8A:
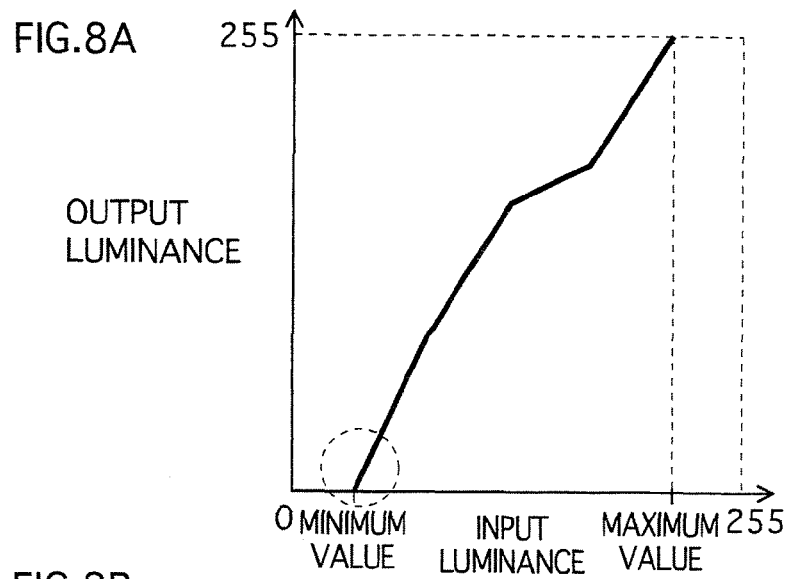
FIG. 8 is a graph showing a correction coefficient of a gradation correction method of a conventional technology, and a correction coefficient of a gradation correction method of the first embodiment.

As shown in FIG. 8A, if simply using a correction coefficient obtained from a histogram, a highest luminance in an effective video period of a video luminance signal is corrected to 255, and a lowest luminance is corrected to 0. Therefore, a contrast of a whole image is improved, but visibility in a low luminance portion is reduced.

Figure 8B:
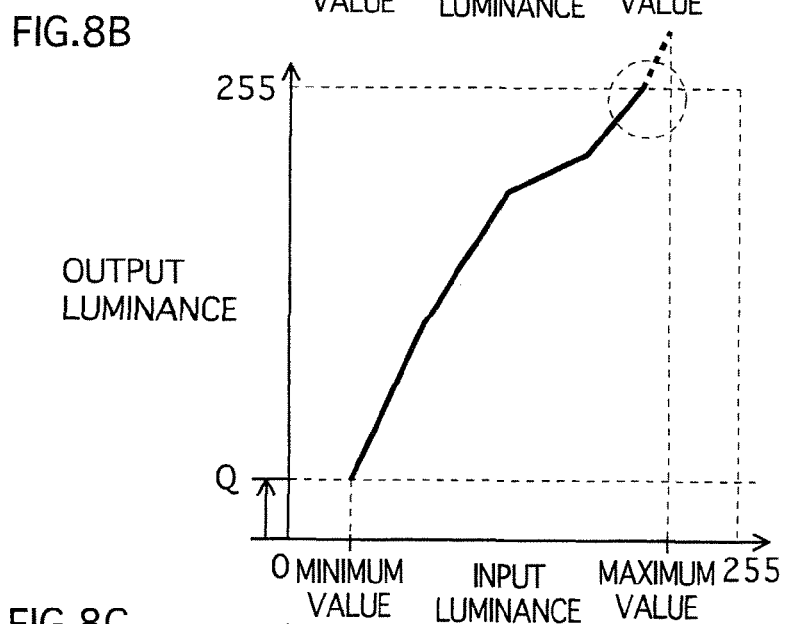

As shown in FIG. 8B, if simply increasing a luminance to maintain visibility, the luminance is saturated in a high luminance portion, and a collision of a black level with a white level occurs because the luminance cannot be larger than 255. As a result, visibility is reduced.

Figure 8C:
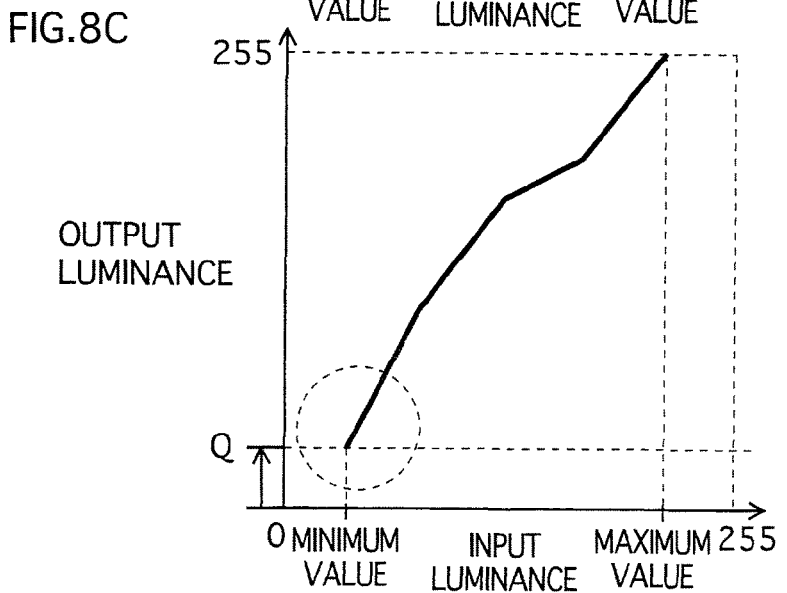

On the other hand, in the first embodiment, a minimum value of a luminance is increased to Q according to a visual environment, and a correction coefficient is proportionally distributed in a range of Q to 255 as shown in FIG. 8C. Therefore, visibilities in both a low luminance portion and a high luminance portion can be improved at the same time.

[2] Second Embodiment

Next, a projector of a second embodiment of the present invention will be described. The projector of the second embodiment has a similar construction to the projector of the first embodiment, but differs in that a skin color pixel in an image is detected and a correction of the skin color pixel is prohibited. This difference will be mainly described below.

(1) Construction of Projector

Figure 9:
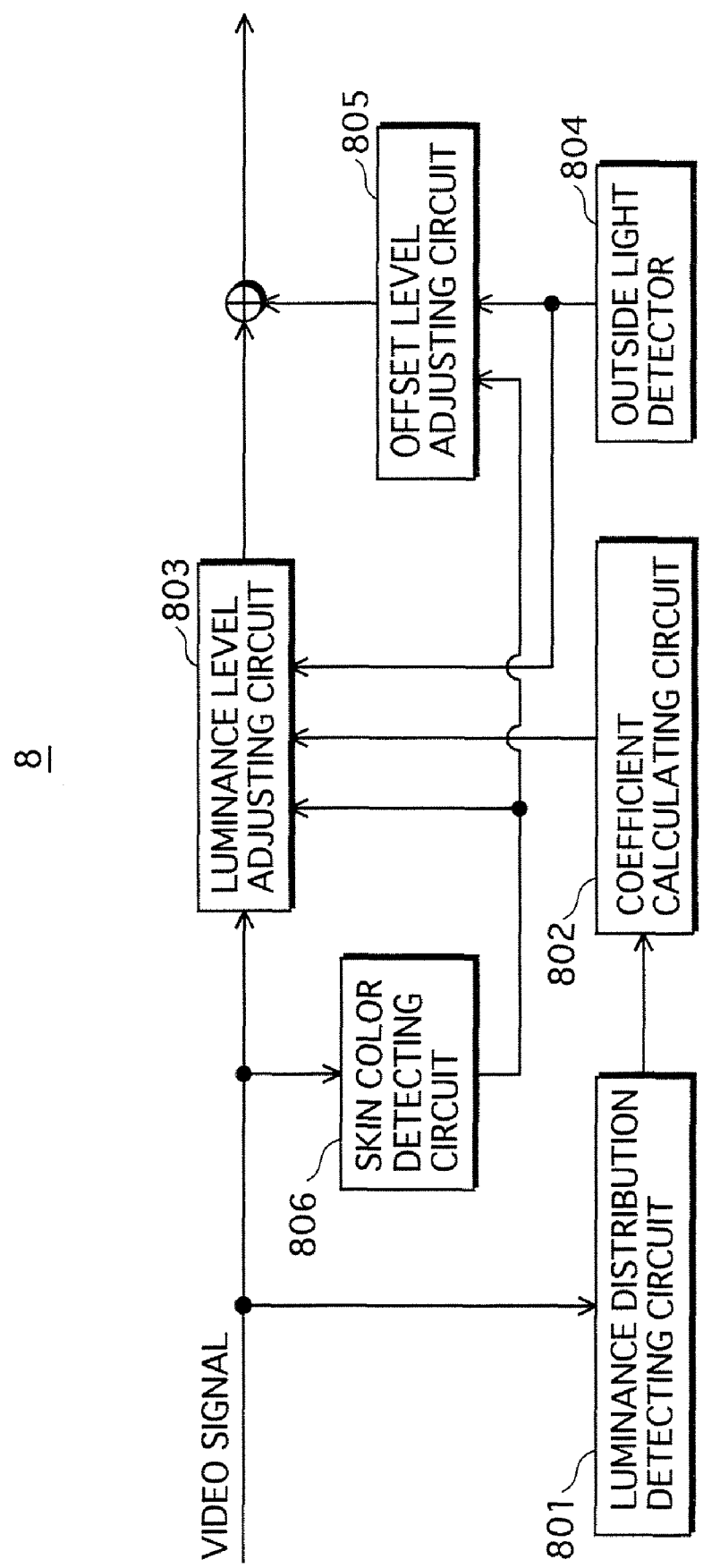
FIG. 9 is a block diagram showing a main construction of a projector of a second embodiment of the present invention.

FIG. 9 is a block diagram showing a main construction of the projector of the second embodiment. As shown in FIG. 9, a projector 8 includes a luminance distribution detecting circuit 801, a coefficient calculating circuit 802, a luminance level adjusting circuit 803, an outside light detector 804, an offset level adjusting circuit 805, and a skin color detecting circuit 806.

The skin color detecting circuit 806 detects a skin color pixel in an effective video period of a video luminance signal, and notifies the luminance level adjusting circuit 803 and the offset level adjusting circuit 805 of the skin color pixel. The luminance level adjusting circuit 803 does not perform a gradation correction on the skin color pixel, and the offset level adjusting circuit 805 does not adjust an offset level of the skin color pixel.

(2) Operation of Projector

Figure 10:
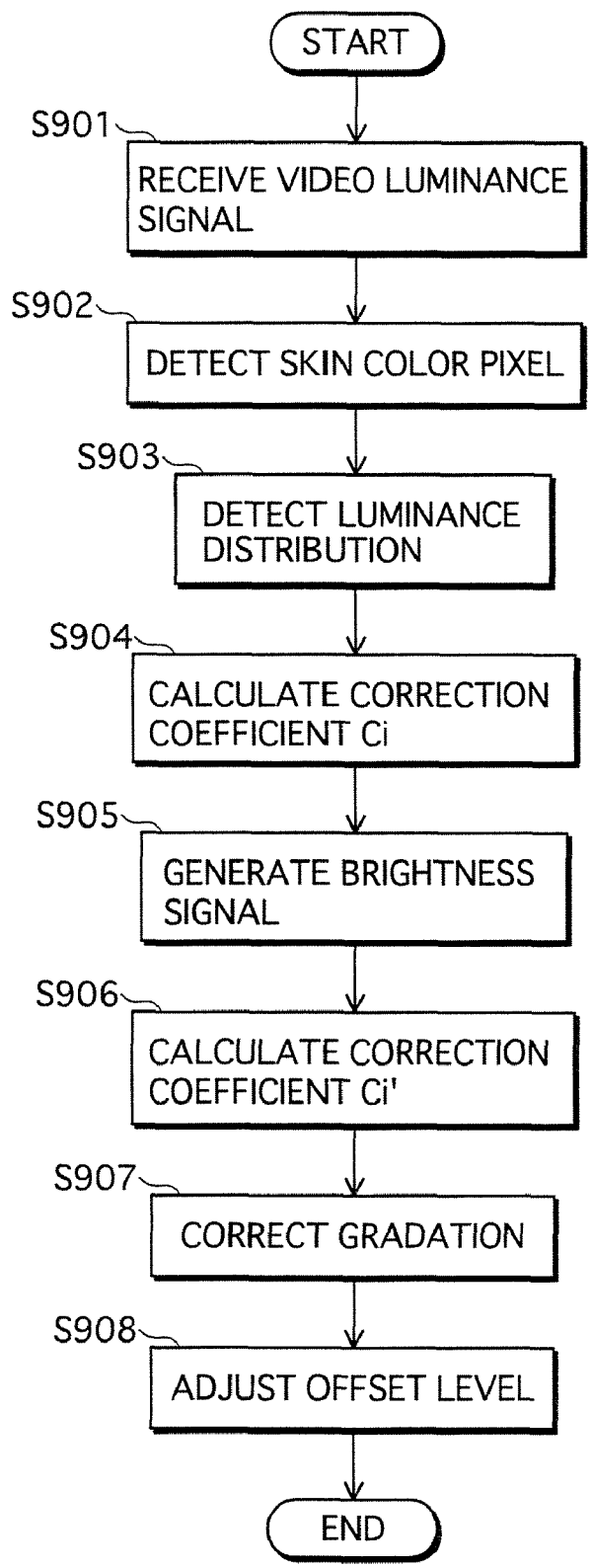
FIG. 10 is a flowchart showing an operation of a projector 8 of the second embodiment of the present invention.

FIG. 10 is a flowchart showing an operation of the projector 8. As shown in FIG. 10, when receiving a video luminance signal (S901), the projector 8 firstly detects a skin color pixel in the skin color detecting circuit 806 (S902), detects a luminance distribution in the luminance distribution detecting circuit 801 (S903), and calculates a correction coefficient $C_i$ in the coefficient calculating circuit 802 (S904).

Next, the projector 8 generates a brightness signal in the outside light detector 804 (S905), and obtains a correction coefficient $C_i'$ in the luminance level adjusting circuit 803, using the brightness signal (S906) to correct an image gradation (S907). Finally, the projector 8 adjusts an offset level in the offset level adjusting circuit 805 (S908).

Generally, an intermediate hue such as a skin color is easy to remain in a human memory, and a subtle color tone difference of a skin color is easy to be recognized. On the other hand, in the second embodiment, a gradation correction of a skin color portion is prohibited for each pixel. In other words, a skin color pixel is outputted without correcting a luminance thereof. Therefore, a gradation can be corrected without deteriorating a color tone in a skin color portion in an image.

Note that instead of the above-mentioned construction, a gradation in a skin color portion may be corrected to the extent that a color tone is not deteriorated. In other words, when a surrounding pixel color is other than a skin color, and a correction amount of a luminance is large, a skin color portion does not fit in the surrounding pixel if a luminance of the skin color pixel is not varied at all. In this case, a luminance of a skin color pixel may be corrected.

However, even in this case, it is preferable that the luminance of the skin color pixel is corrected so that a correction amount of the skin color pixel is smaller than the surrounding pixel. With the above-mentioned construction, a natural image display can be realized because a skin color portion fits in a surrounding pixel.

If a surrounding pixel color is a skin color, a luminance of a skin color pixel may not be corrected. A change of a skin color is sensitively recognized in a human skin portion. Therefore, whether a pixel is a human skin portion is judged by whether a surrounding pixel is a skin color, and if the surrounding pixel is a skin color, a luminance of a skin color pixel is not corrected. With this construction, a natural figure can be displayed by avoiding a color modulation in a human skin portion.

Note that regarding a yellow race, a skin color is an intermediate color between a red color and a yellow color, and a luminance of a skin color is in a range of 50% to 60% of a maximum luminance which is a brightest luminance. If a skin color is expressed by mixing three primary colors RGB in 256 gradations from 0 to 255, a skin color of a yellow race is expressed by a red color 255, a green color 232, and a blue color 192, for example. A skin color of a white race is expressed by a red color 255, a green color 208, and a blue color 192, for example. A skin color of a black race is expressed by a red color 105, a green color 52, and a blue color 44, for example. Note that a luminance of 0 is darkest, and a luminance of 255 is brightest.

[3] Third Embodiment

Figure 11:
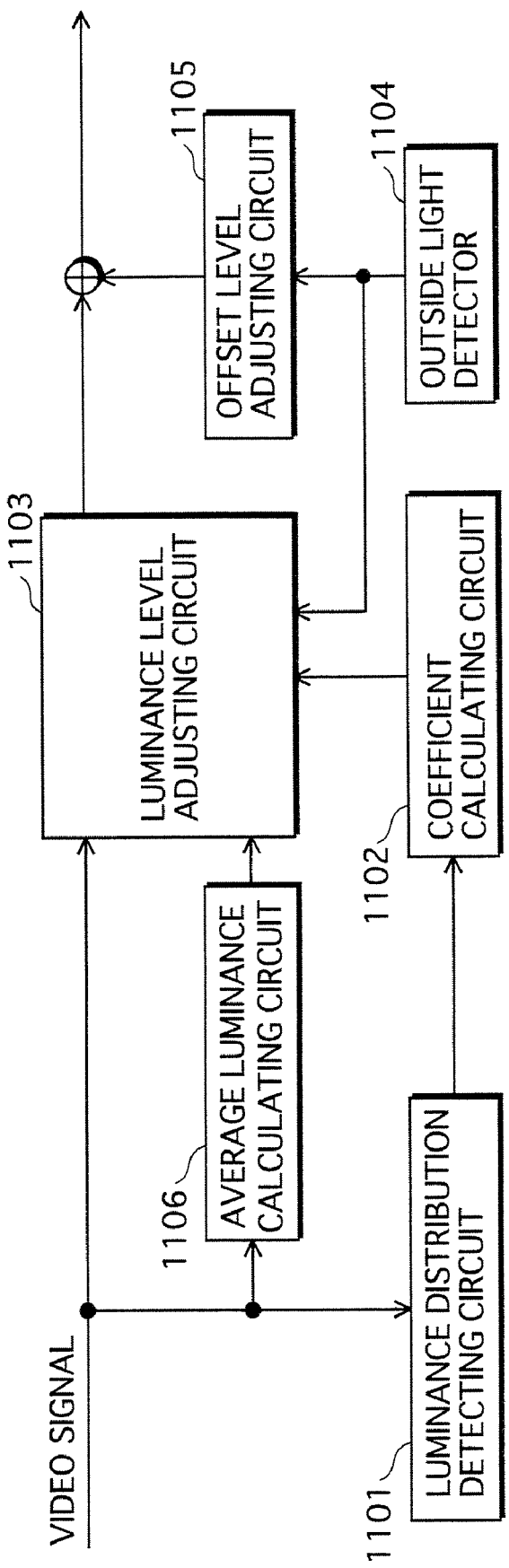
FIG. 11 is a block diagram showing a main construction of a projector of a third embodiment of the present invention.

Next, a projector of a third embodiment of the present invention will be described. The projector of the third embodiment has a similar construction to the projector of the first embodiment, but differs in that a correction coefficient is adjusted by detecting an average luminance of an image. This difference will be mainly described below.
(1) Construction of Projector FIG. 11 is a block diagram showing a main construction of the projector of the third embodiment. As shown in FIG. 11, a projector 11 includes a luminance distribution detecting circuit 1101, a coefficient calculating circuit 1102, a luminance level adjusting circuit 1103, an outside light detector 1104, an offset level adjusting circuit 1105, and an average luminance calculating circuit 1106.

The average luminance calculating circuit 1106 calculates an average luminance in an effective video period of a video luminance signal, and notifies the luminance level adjusting circuit 1103 of the average luminance. The luminance level adjusting circuit 1103 adjusts a correction coefficient obtained in the coefficient calculating circuit 1102 based on a result in the average luminance calculating circuit 1106, so that a correction value is equal to or smaller than a predetermined value by preventing the correction coefficient from being excessively corrected in a dark gradation level and a bright gradation level.
(2) Operation of Projector 11

Figure 12:
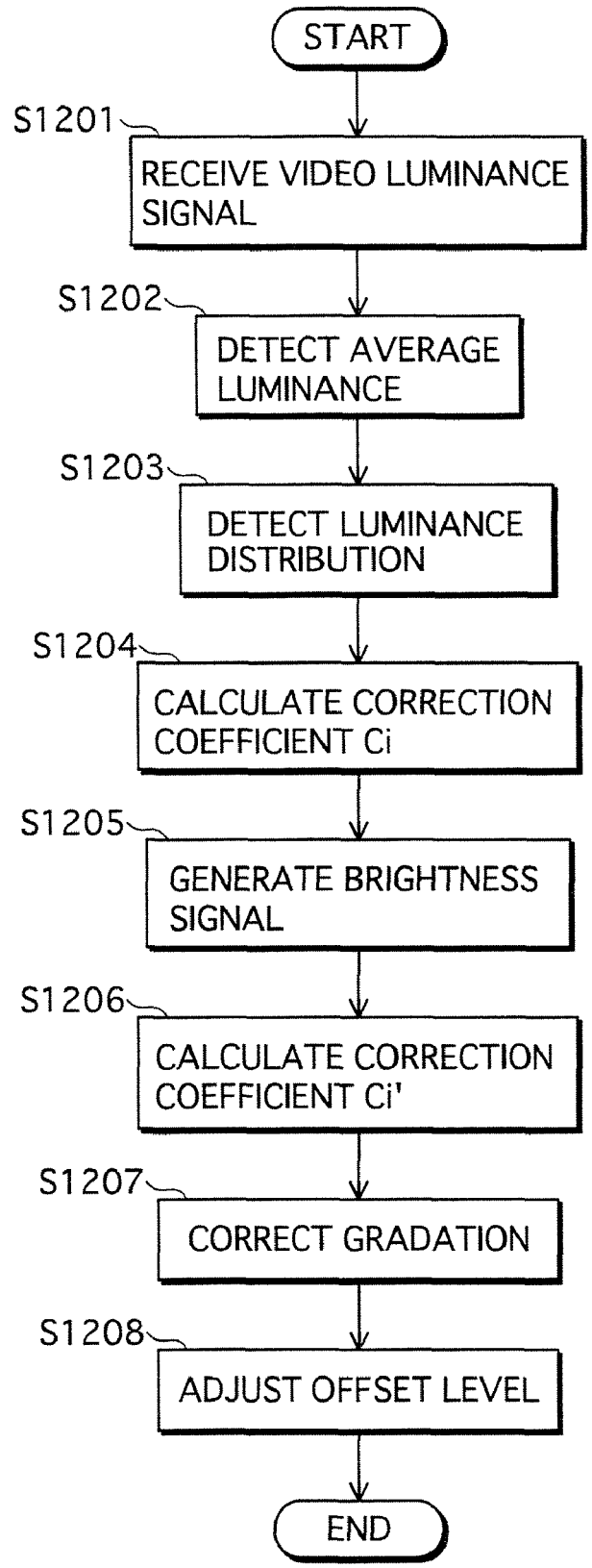
FIG. 12 is a flowchart showing an operation of a projector 11 of the third embodiment of the present invention.

FIG. 12 is a flowchart showing an operation of the projector 11. As shown in FIG. 12, when receiving a video luminance signal (S1201), the projector 11 firstly calculates an average luminance in the average luminance calculating circuit 1106 (S1202), detects a luminance distribution in the luminance distribution detecting circuit 1101 (S1203), and calculates a correction coefficient $C_i$ in the coefficient calculating circuit 1102 (S1204).

Next, the projector 11 generates a brightness signal in the outside light detector 1104 (S1205), and obtains a correction coefficient $C_i'$ in the luminance level adjusting circuit 1103, using the brightness signal. In this case, the correction coefficient is obtained by preventing an image having a biased frequency from being excessively corrected (S1206). Then, an image gradation is corrected (S1207). Finally, the projector 11 adjusts an offset level in the offset level adjusting circuit 1105 (S1208).

Suppose, for instance, there is an image having a black background, and a foreground in which a black object such as a crow is expressed. In this case, if a gradation is corrected simply based on a histogram, a luminance of the craw in the foreground may be too high because the correction is excessive. On the other hand, in the third embodiment, an average luminance of an image has been detected in advance, and a gradation is corrected without largely deviating from the average luminance.

Figure 13A:
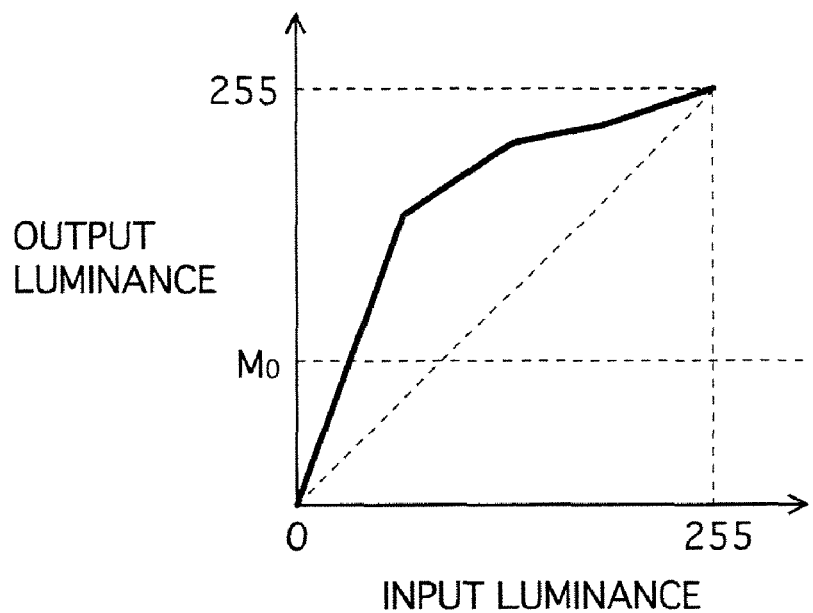
FIG. 13 is a graph showing that the projector 11 of the third embodiment of the present invention adjusts a correction coefficient.
Figure 13B:
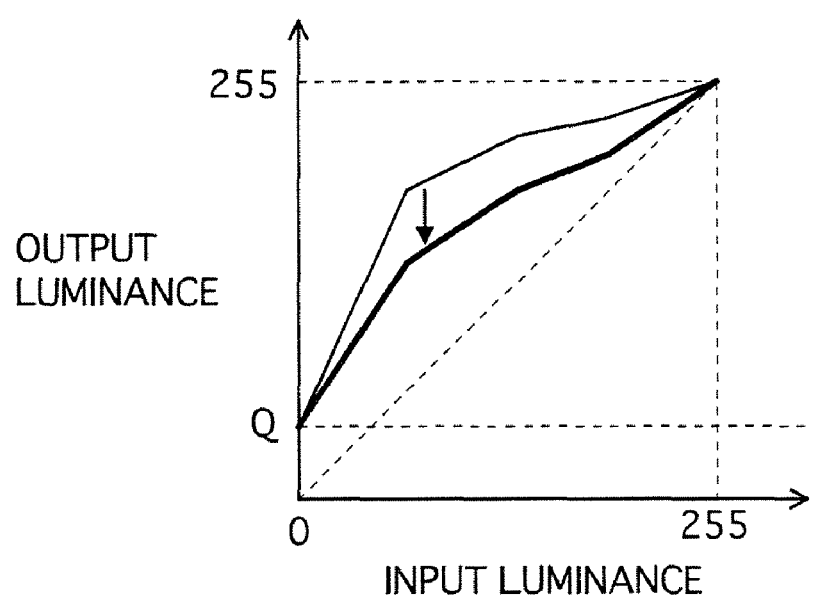

FIG. 13 is a graph showing that the projector 11 adjusts a correction coefficient. Firstly, the coefficient calculating circuit 1102 calculates a correction coefficient (FIG. 13A). In FIG. 13A, $M_0$ is an average luminance obtained from a luminance distribution before a correction. Even if a correction coefficient is adjusted according to the first embodiment when there is outside light, an image is brightly displayed when a signal having a slightly-high input luminance level is inputted because of the following reason. The reason is that a correction coefficient in a low input luminance level portion is too large, though the average luminance $M_0$ is small (a dark image scene). On the other hand, when the average luminance $M_0$ is small (a dark image scene), a correction is performed so as to prevent a correction coefficient from being larger than a predetermined correction coefficient. This can prevent an image from being unnatural (FIG. 13B).

[4] Fourth Embodiment

Figure 14:
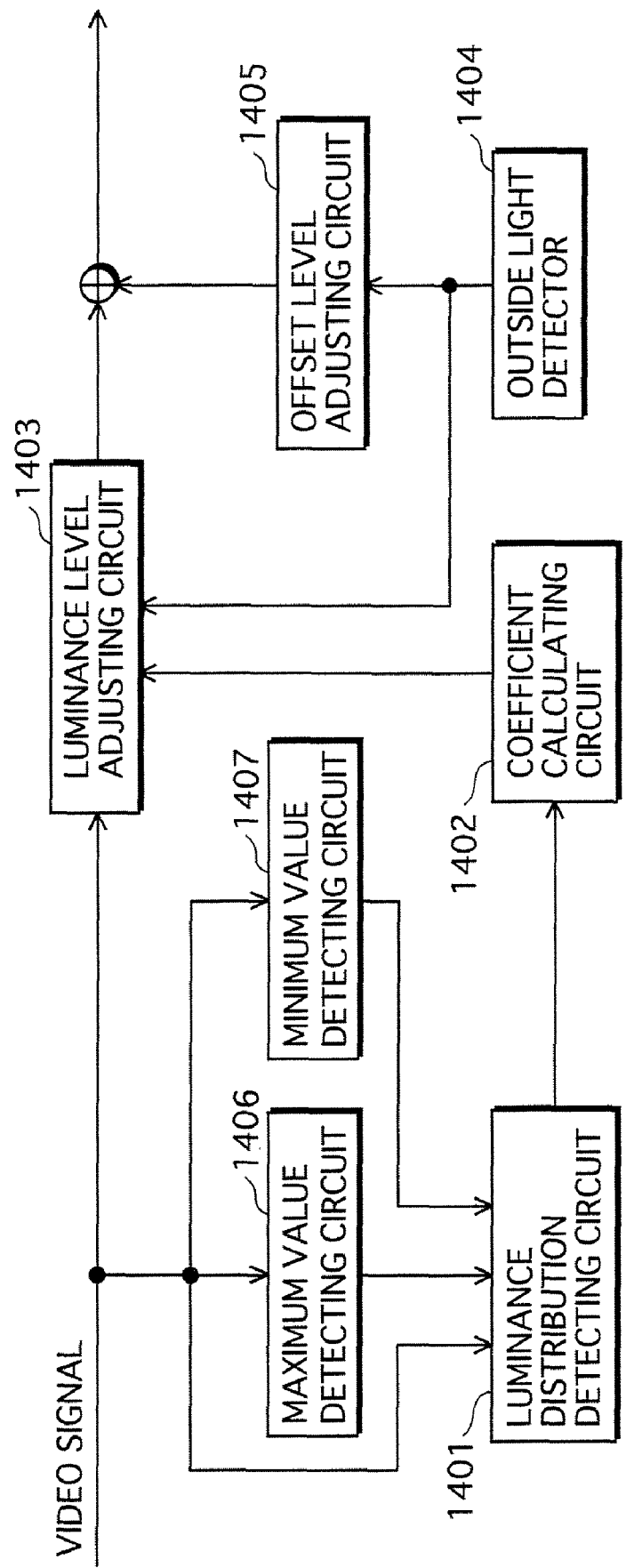
FIG. 14 is a block diagram showing a main construction of a projector of a fourth embodiment of the present invention.

Next, a projector of a fourth embodiment of the present invention will be described. The projector of the fourth embodiment has a similar construction to the projector of the first embodiment, but differs in that a luminance distribution is corrected by detecting a minimum value and a maximum value of a luminance in an effective video period of a video luminance signal. This difference will be mainly described below.
(1) Construction of Projector FIG. 14 is a block diagram showing a main construction of the projector of the fourth embodiment. As shown in FIG. 14, a projector 14 includes a luminance distribution detecting circuit 1401, a coefficient calculating circuit 1402, a luminance level adjusting circuit 1403, an outside light detector 1404, an offset level adjusting circuit 1405, a maximum value detecting circuit 1406, and a minimum value detecting circuit 1407.

The maximum value detecting circuit 1406 detects a maximum value of a luminance in an effective video period of a video luminance signal. The minimum value detecting circuit 1407 detects a minimum value in the effective video period. Then, the luminance distribution detecting circuit 1401 is notified of the maximum value and the minimum value. The luminance distribution detecting circuit 1401 proportionally distributes frequencies of luminances distributed in a range of the minimum value to the maximum value, to a range of 0 to 255 as a luminance distribution.
(2) Operation of Projector 14

Figure 15:
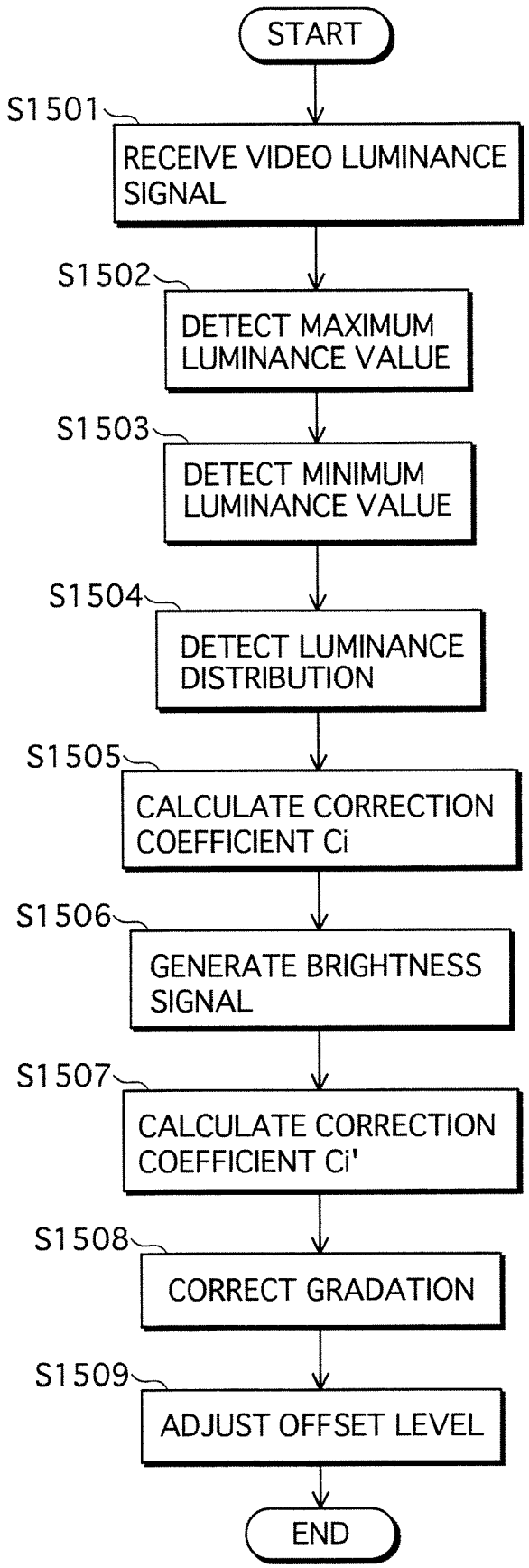
FIG. 15 is a flowchart showing an operation of a projector 14 of the fourth embodiment of the present invention.

FIG. 15 is a flowchart showing an operation of the projector 14. As shown in FIG. 15, when receiving a video luminance signal (S1501), the projector 14 firstly calculates a maximum value of a luminance in the maximum value detecting circuit

1406 (S1502), and calculates a minimum value of the luminance in the minimum value detecting circuit 1407 (S1503). Then, the projector 14 detects a luminance distribution in the luminance distribution detecting circuit 1401 (S1504), and calculates a correction coefficient $C_i$ in the coefficient calculating circuit 1402 (S1505).

Next, the projector 14 generates a brightness signal in the outside light detector 1404 (S1506), and adjusts a correction coefficient in the luminance level adjusting circuit 1403, using the brightness signal. In this case, the projector 14 obtains a correction coefficient $C_i'$ so as to proportionally distribute frequencies of luminances distributed in a range of the minimum value to the maximum value, to a range of 0 to 255 (S1507). Then, an image gradation is corrected (S1508). Finally, the projector 14 adjusts an offset level in the offset level adjusting circuit 1405 (S1509).

Figure 16:
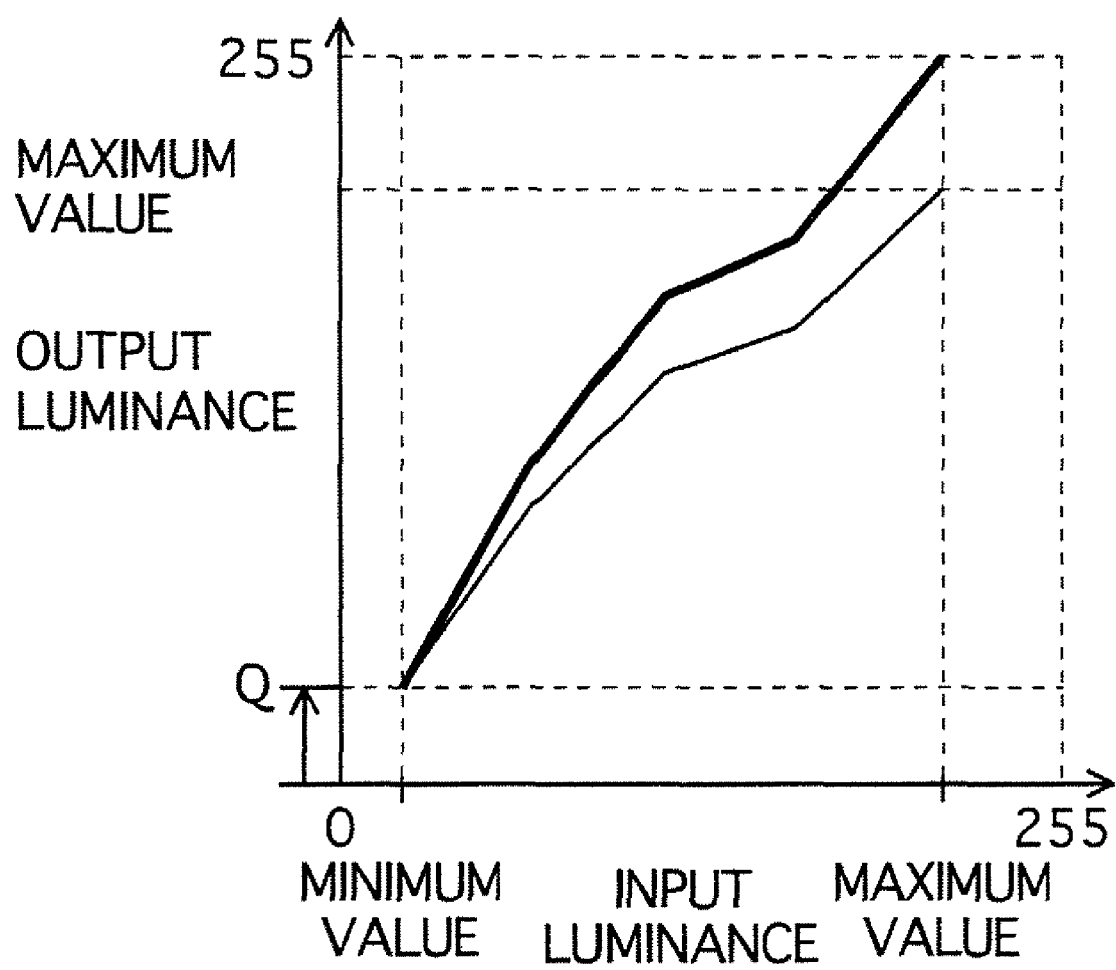
FIG. 16 is a graph showing that the projector 14 of the fourth embodiment of the present invention adjusts a correction coefficient.

FIG. 16 is a graph showing that the projector 14 adjusts a correction coefficient. As shown in FIG. 16, firstly, a correction coefficient is adjusted so as to correct an input luminance in a range of a minimum value to a maximum value of a luminance in an effective video period of a video luminance signal, to an output luminance in a range of a luminance Q which is higher than the minimum value to the maximum value. Then, the correction coefficient is adjusted so that the maximum value of the input luminance is converted into a luminance of 255. This can improve visibility by further enhancing an image contrast.

[5] Fifth Embodiment

Next, a projector of a fifth embodiment of the present invention will be described. The projector of the fifth embodiment has a similar construction to the projector of the first embodiment, but differs in that a black level of an image is corrected after a gradation is corrected. This difference will be mainly described below.

(1) Construction of Projector

Figure 17:
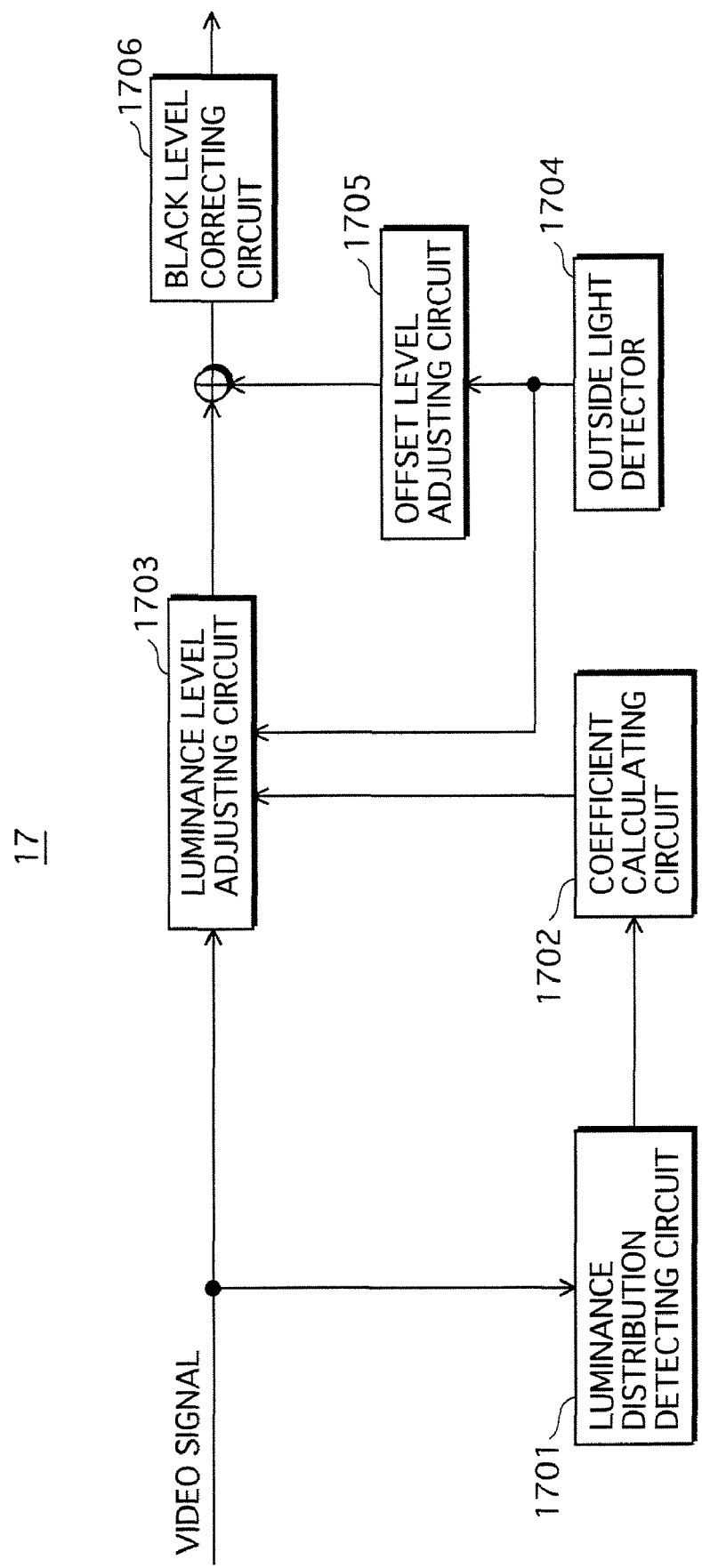
FIG. 17 is a block diagram showing a main construction of a projector of a fifth embodiment of the present invention.

FIG. 17 is a block diagram showing a main construction of the projector of the fifth embodiment. As shown in FIG. 17, a projector 17 includes a luminance distribution detecting circuit 1701, a coefficient calculating circuit 1702, a luminance level adjusting circuit 1703, an outside light detector 1704, an offset level adjusting circuit 1705, and a black level correcting circuit 1706. The black level correcting circuit 1706 lowers a luminance in a low luminance portion.

(2) Operation of Projector 17

Figure 18:
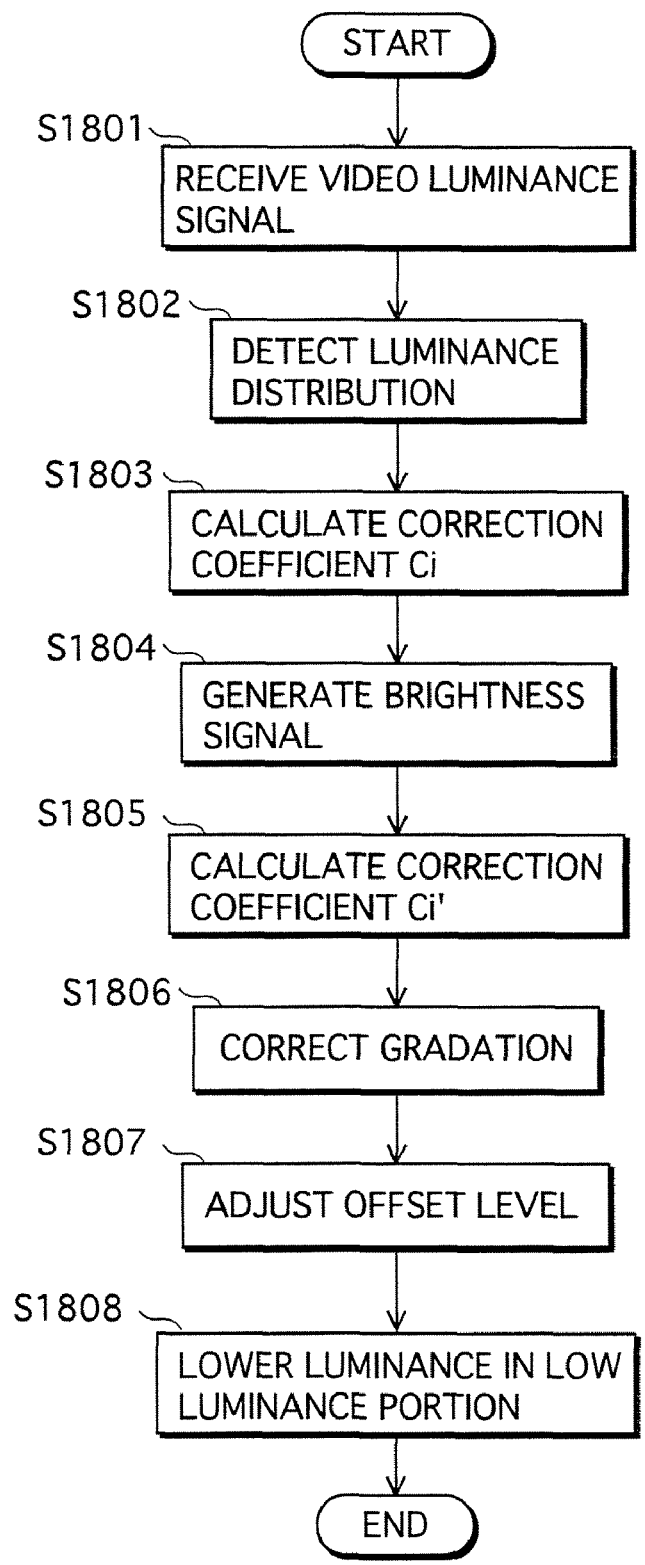
FIG. 18 is a flowchart showing an operation of a projector 17 of the fifth embodiment of the present invention.

FIG. 18 is a flowchart showing an operation of the projector 17. As shown in FIG. 18, when receiving a video luminance signal (S1801), the projector 17 detects a luminance distribution in the luminance distribution detecting circuit 1701 (S1802), and calculates a correction coefficient $C_i$ in the coefficient calculating circuit 1702 (S1803).

Next, the projector 17 generates a brightness signal in the outside light detector 1704 (S1804), obtains a correction coefficient $C_i'$ in the luminance level adjusting circuit 1703 (S1805), and corrects an image gradation (S1806). Then, the projector 17 adjusts an offset level in the offset level adjusting circuit 1705 (S1807). Finally, the projector 17 lowers a luminance in a low luminance portion in the black level correcting circuit 1706 (S1808).

Figure 19:
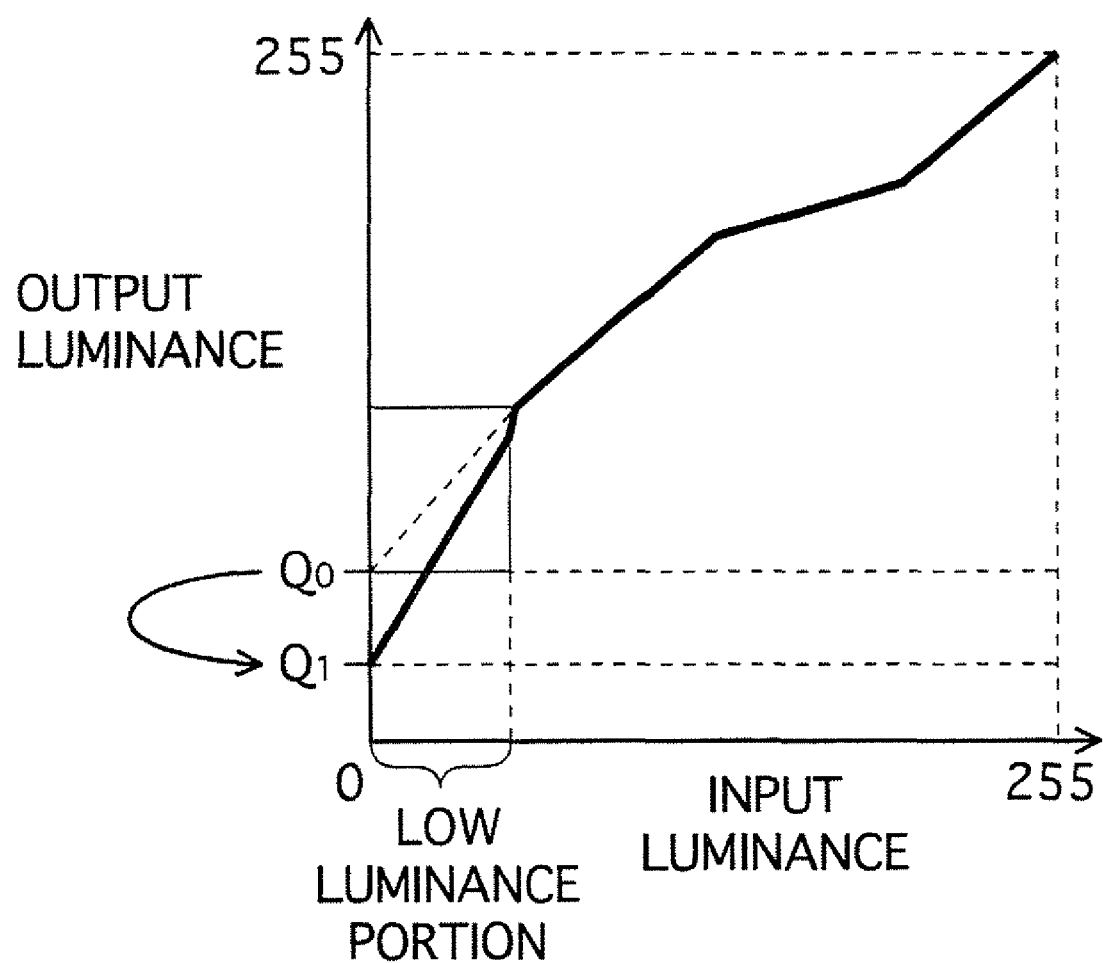
FIG. 19 is a graph showing that a block level correcting circuit 1706 of the fifth embodiment of the present invention lowers a luminance in a low luminance portion.

According to the fifth embodiment, when a correction coefficient Q is large because of high-intensity outside light, a luminance in a lowest luminance portion may be too high after a correction. On the other hand, the black level correcting circuit 1706 lowers a luminance in a low luminance portion. Therefore, an image can be clarified because blackness is emphasized. FIG. 19 is a graph showing that the block level correction circuit 1706 lowers a luminance in a low luminance portion. As shown in FIG. 19, the block level correcting circuit 1706 lowers an output luminance in a low luminance portion by adjusting an output luminance $Q_0$ corresponding to an input luminance of 0 to an output luminance $Q_1$.

[6] Modification

Up to now, the image display device and the image display method of the present invention have been described specifically through the embodiments. However, the technical scope of the present invention is not limited to the above-described embodiments. For example, the following are modifications.

(1) In the above-described embodiments, the present invention is described by mainly taking a projector as an example. However, the present invention is not limited to a projector, and may be applied to an image display device other than a projector. Especially, it is preferable that the present invention is applied to an image display device having a problem that a screen is not easily viewable because of an effect of outside light and the like.

(2) In the above-described embodiments, a case where an outside light sensor is fitted on a main body of a projector as a unit is mainly described. However, the present invention is not limited to this case, and an effect of the present invention can be obtained without fitting an outside light sensor on a main body of a projector as a unit. For example, an outside light sensor may be fitted on a front of a screen to measure an intensity of outside light entering into a screen. Also, an outside light sensor may be detached from a projector so as to measure brightness at a proper position according to an environment in which the projector is used.

(3) In the above-described embodiments, a case where a correction coefficient is determined by dividing luminances of 256 gradations into 4 levels is mainly described. However, the present invention is not limited to this, and a correction coefficient may be determined by dividing luminances of 256 gradations into a plurality of levels other than 4. Also, an effect of the present invention can be obtained by using the number of gradations such as 10 bits:1024 gradations and the like, which is other than 8 bits:256 gradations.

(4) Although it is not especially mentioned in the above-described embodiments, the image processor of the present invention may be a program for performing the above-mentioned gradation correction by receiving a signal indicating an outside light intensity, or may be exclusive LSI (Large Scale Integration).

(5) In the above-described embodiments, a case where a correction coefficient $C_i'$ is obtained by adjusting all correction coefficients $C_i$ (i=1 to 4) is described. However, the present invention is not limited to this, and a correction coefficient $C_i$ may be adjusted regarding only a low luminance portion. In this case, an adjusted coefficient may be only a correction coefficient $C_i$ in a lowest luminance portion, or $C_3$ may be adjusted from $C_1$ and $C_2$ or from $C_1$.

(6) Although it is not especially mentioned in the above-described embodiments, a value of a correction coefficient Q in the first embodiment may be no more than 80 in case of 256 gradations. Also, a value of a correction coefficient Q may be no more than 160 in case of 512 gradations. This can minimize a problem of a contrast degradation and the like, which is caused because an output luminance range is restricted.

(7) In the above-described embodiments, all pixels of an image are sampled when obtaining an average luminance level of the image. However, the present invention is not limited to this, and thinning-out sampling may be performed such as every two pixels or four pixels. This can reduce a circuit size.

INDUSTRIAL APPLICABILITY

The image display device and the image display method of the present invention are useful as a technology for correcting a gradation so as to improve visibility by eliminating an influence of outside light in an image display device.

The invention claimed is:

1. An image display device for displaying a multiple gradation image, comprising:
    a light measuring unit operable to measure an outside light intensity; and
    a correcting unit operable to perform a gradation correction by processing image data to cause (i) luminance values to be distributed in a smaller luminance value range, the larger the outside light intensity is, and (ii) the luminance value range to include a highest luminance value displayable by the image display device, wherein
    the gradation correction is performed to cause a correction coefficient Ci to be larger, the larger a frequency of the luminance values in a portion of the luminance value range in an effective video period is.

2. The image display device of claim 1, further comprising:
    a detecting unit operable to detect a skin color pixel having a skin color luminance and a skin color hue, wherein
    the performance of the gradation correction on the skin color pixel is suppressed.

3. The image display device of claim 2, wherein
    the gradation correction is performed on a pixel other than the skin color pixel to cause a luminance change to be smaller, the closer to a skin color a luminance value and a hue of the pixel are.

4. The image display device of claim 2, wherein
    the performance of the gradation correction on the skin color pixel is suppressed when other skin color pixels exist around the skin color pixel.

5. The image display device of claim 1, further comprising:
    a first calculating unit operable to calculate an average luminance value M0 of all pixels composing the image; and
    a changing unit operable to, if a difference between an average luminance value $M_1$ and the average luminance value $M_0$ is larger than a predetermined value, change a correction coefficient $C_i'$ to cause the difference to be equal to or smaller than the predetermined value, the average luminance value $M_1$ being obtained by the correcting unit performing the gradation correction on the average luminance value $M_0$.

6. The image display device of claim 1, further comprising:
    a lowering unit operable to lower luminance values in a predetermined luminance value range including a lowest luminance value, if the luminance values are higher than a predetermined luminance value after the gradation correction is performed by the correcting unit.

7. The image display device of claim 1, further comprising:
    a second calculating unit operable to calculate a maximum value and a minimum value of luminance values of all pixels composing an image belonging to an effective video period of a video luminance signal; and
    a distributing unit operable to, as a luminance distribution, proportionally distribute frequencies of the luminance values distributed in a range of the minimum value to the maximum value, to a range of 0 to a maximum gradation number, wherein
    the gradation correction is performed on the proportionally distributed luminance distribution.

8. An image display method performed by an image display device for displaying a multiple gradation image, the image display method comprising:
    a light measuring step of measuring an outside light intensity; and
    a correcting step of performing a gradation correction by processing a video luminance signal to cause (i) luminance values to be distributed in a smaller luminance value range, the larger the outside light intensity is, and (ii) the luminance value range to include a highest luminance value displayable by the image display device, wherein
    the gradation correction is performed to cause a correction coefficient Ci to be larger, the larger a frequency of the luminance values in a portion of the luminance value range in an effective video period is.

9. The image display method of claim 8, further comprising:
    a detecting step of detecting a luminance or a hue of a skin color pixel, wherein
    the performance of the gradation correction on the skin color pixel is suppressed.

10. The image display method of claim 9, wherein
    the gradation correction is performed on a pixel other than the skin color pixel to cause a luminance change to be smaller, the closer to a skin color a luminance value and a hue of the pixel are.

11. The image display method of claim 9, wherein
    the performance of the gradation correction on the skin color pixel is suppressed when other skin color pixels exist around the skin color pixel.

12. The image display method of claim 8, further comprising:
    a first calculating step of calculating an average luminance value $M_0$ of all pixels composing the image; and
    a changing step of, if a difference between an average luminance value $M_1$ and the average luminance value $M_0$ is larger than a predetermined value, changing a correction coefficient $C_i'$ to cause the difference to be equal to or smaller than the predetermined value, the average luminance value $M_1$ being obtained by the correcting unit performing the gradation correction on the average luminance value $M_0$.

13. The image display method of claim 8, further comprising:
    a lowering step of lowering luminance values in a predetermined luminance value range including a lowest luminance value, if the luminance values are higher than a predetermined luminance value after the gradation correction is performed by the correcting step.

14. The image display method of claim 8, further comprising:
    a second calculating step of calculating a maximum value and a minimum value of luminance values of all pixels composing an image belonging to an effective video period of the video luminance signal; and
    a distributing step of, as a luminance distribution, proportionally distributing frequencies of the luminance values distributed in a range of the minimum value to the maximum value, to a range of 0 to a maximum gradation number, wherein the gradation correction is performed on the proportionally distributed luminance distribution.

* * * * *